(12) United States Patent
Foster et al.

(10) Patent No.: US 9,624,899 B2
(45) Date of Patent: Apr. 18, 2017

(54) REACTION BODY FOR WAVE ENERGY APPARATUS

(75) Inventors: Graham Foster, Cockett (GB); Gareth Stockman, Uplands (GB); John Chapman, Brynmill (GB)

(73) Assignee: Marine Power Systems Limited, Swansea (GB)

( * ) Notice: Subject to any disclaimer, the term of this patent is extended or adjusted under 35 U.S.C. 154(b) by 435 days.

(21) Appl. No.: 13/704,897

(22) PCT Filed: Jun. 20, 2011

(86) PCT No.: PCT/GB2011/000925
§ 371 (c)(1),
(2), (4) Date: Mar. 12, 2013

(87) PCT Pub. No.: WO2011/158006
PCT Pub. Date: Dec. 22, 2011

(65) Prior Publication Data
US 2013/0160444 A1  Jun. 27, 2013

(30) Foreign Application Priority Data

Jun. 18, 2010 (GB) .................................. 1010261.4

(51) Int. Cl.
F03B 13/26 (2006.01)
F03B 13/18 (2006.01)
F03B 13/20 (2006.01)
(52) U.S. Cl.
CPC .......... F03B 13/1885 (2013.01); F03B 13/20 (2013.01); F05B 2240/917 (2013.01); F05B 2270/18 (2013.01); Y02E 10/38 (2013.01)

(58) Field of Classification Search
CPC ...... F03B 13/1885; F03B 13/00; F03B 13/10; F03B 13/14
See application file for complete search history.

(56) References Cited

U.S. PATENT DOCUMENTS 4,118,932 A * 10/1978 Sivill ...................... F03B 13/20
417/332
4,345,536 A * 8/1982 Gregg ..................... B63B 27/02
114/124
4,364,715 A * 12/1982 Bolding .............. F03B 13/1815
417/100

(Continued)

FOREIGN PATENT DOCUMENTS

AU         55812    11/1974
AU       55812/73   11/1974

(Continued)

*Primary Examiner* — Thomas Denion
*Assistant Examiner* — Shafiq Mian
(74) *Attorney, Agent, or Firm* — Larson & Anderson, LLC

(57) ABSTRACT

A subsurface reaction body arranged for use in apparatus for converting wave motion in a body of water to useful energy is provided. The subsurface reaction body is arranged to be selectively filled with air to a maximum buoyancy configuration and to be filled with water to a minimum buoyancy configuration. The subsurface reaction body has an arrangement of chambers therein to inhibit free flow of water through the reaction body and to define at least one further preset buoyancy configuration between the respective maximum and minimum configuration.

18 Claims, 4 Drawing Sheets

(56) References Cited

U.S. PATENT DOCUMENTS

| | | | | |
|---|---|---|---|---|
| 4,464,080 A * | 8/1984 | Gorlov | E02B 9/08 | |
| | | | 405/76 | |
| 4,781,023 A * | 11/1988 | Gordon | F03B 13/20 | |
| | | | 290/42 | |
| 5,359,229 A * | 10/1994 | Youngblood | F03B 13/1855 | |
| | | | 290/42 | |
| 6,229,225 B1 | 5/2001 | Carroll | | |
| 6,676,334 B2 * | 1/2004 | Horton, III | B63B 35/44 | |
| | | | 114/259 | |
| 6,990,918 B2 * | 1/2006 | Markie | 114/273 | |
| 7,245,041 B1 | 7/2007 | Olson | | |
| 7,373,892 B2 * | 5/2008 | Veazey | A01K 61/005 | |
| | | | 114/65 A | |
| 7,443,046 B2 | 10/2008 | Stewart et al. | | |
| 8,093,736 B2 * | 1/2012 | Raftery | F03B 13/1885 | |
| | | | 290/42 | |
| 8,484,964 B2 * | 7/2013 | Preftitsis | F03B 13/20 | |
| | | | 60/495 | |
| 8,534,213 B2 * | 9/2013 | Chitwood | B63B 35/40 | |
| | | | 114/258 | |
| 8,778,176 B2 * | 7/2014 | Murtha | B01D 24/14 | |
| | | | 210/170.11 | |
| 2008/0142076 A1 * | 6/2008 | Horne et al. | 136/259 | |
| 2009/0084296 A1 * | 4/2009 | McCormick | F03B 13/20 | |
| | | | 114/26 | |
| 2009/0102199 A1 * | 4/2009 | Voropaev | 290/53 | |
| 2010/0320759 A1 * | 12/2010 | Lightfoot | F03B 13/20 | |
| | | | 290/42 | |
| 2011/0061377 A1 * | 3/2011 | Preftitsis | F03B 13/20 | |
| | | | 60/500 | |
| 2012/0153627 A1 * | 6/2012 | Jo | F03B 13/20 | |
| | | | 290/53 | |

FOREIGN PATENT DOCUMENTS

| | | | |
|---|---|---|---|
| EP | 0 265 594 A1 | 5/1988 | |
| FR | 2892431 | 4/2007 | |
| GB | 2414771 | 12/2005 | |
| SU | 1070438 A * | 1/1982 | B63B 9/02 |
| WO | 98/20254 A1 | 5/1998 | |
| WO | 2008/130295 A1 | 10/2008 | |
| WO | 2010/007418 A2 | 1/2010 | |

* cited by examiner

REACTION BODY FOR WAVE ENERGY APPARATUS

This application is the national stage of PCT/GB2011/000925 filed Jun. 20, 2011, which claims priority to GB1010261.4 filed on Jun. 18, 2010 which is incorporated herein by reference.

The present invention relates to generating apparatus that can be used to extract energy from waves in a body of water by converting such energy to useful energy, and reaction bodies for use therewith.

In recent years, there has been increased emphasis on the need to exploit renewable energy so that it significantly contributes to global energy production.

One potential renewable energy source is wave power—an abundant and consistent energy resource available in all of the world's large oceans and seas. Various wave power generating devices have emerged as a potential method of capturing this energy, however, current devices have many limitations with no one device having the proven ability to reliably exploit the available resource long term.

As described in our WO2010007418, existing designs for generating electricity from wave power can be divided into six main categories: floating attenuators, surge converters, oscillating water column devices, overtopping devices, submerged pressure differential devices and point absorbers. Most of these can be either floating or based on the sea bed. There are also other types of device which are not easy to categorise, examples being soft flexible structures or rotors that are turned directly by the waves. Each of these different approaches has its own inherent advantages and disadvantages.

Of the known devices, point absorbers seem to offer the least problematic solution to the extraction of power from ocean waves. The advantages of being flexible to position, simple to install, serviceable, reasonably transportable, and reasonably survivable make them most likely to be able to meet the challenge of reliably extracting power from the sea.

Various designs of point absorber have been proposed. For example, U.S. Pat. No. 7,245,041 discloses a device in which a series of wave operated floats suspend a common crankshaft with a spring biasing each float. The mass of the common crankshaft and surrounding casing resists the movement of the floats but there is no method by which its inertia can be further increased, or any way by which the device can attain a convenient transportation configuration.

AU5581273 discloses a point absorber device which has a subsea reaction member that can be filled with water to increase its inertia. However, the reaction member is not biased toward the float and there is no way for the device to achieve a convenient transportation configuration.

JP55125364 discloses a point absorber device with a flat plate reaction member movably coupled to a surface float and constrained by a linear generator. However, the inertia of the reaction member cannot be increased and the device has no convenient transportation configuration.

U.S. Pat. No. 6,229,225 discloses a subsea surging device in which an energy converter is biased by a spring. However, the device is constrained by anchoring to the sea bed and therefore very difficult to install and maintain.

EP0265594 and WO2008130295 disclose point absorber devices in which an energy converter is biased by a spring. Such devices are constrained by anchoring to the sea bed and are therefore very difficult to install and maintain.

The abovementioned WO2010007418 discloses a point absorber comprising a float which is movable in response to wave motion and a subsurface reaction body having adjustable buoyancy and respective maximum and minimum buoyancy configurations, the subsurface reaction body being connected to the float by a flexible connecting line and having inertia and/or drag to resist movement of the float caused by wave motion.

Relative movement between the subsurface reaction body and the float is permitted and there is an energy convertor for converting the relative movement to useful energy; and the subsurface reaction body is directionally biased relative to the float.

The subsurface reaction body is suspended from the float at a depth set by the length of the connecting line in the minimum buoyancy configuration and floating on the surface of the body of water in the maximum buoyancy configuration.

The arrangement just described and illustrated in WO2010007418 at least alleviates many of the difficulties associated with wave energy devices in general and point absorbers in particular.

The reaction body or member described in WO2010007418 contains a single chamber that can be selectively filled with air or water. This meets the requirements of the device for the surface configuration in which the interior volume is filled wholly with air, and for the operating configuration in which the interior volume is wholly filled with water.

However, as the reaction body is likely to be a large vessel, and water in the internal space is unconstrained, sloshing of the water inside the reaction body or collection at one end is likely to lead to stability problems during the deployment and recovery of the apparatus.

In addition, when the reaction body of the wave energy converter disclosed in WO2010007418 is ascended or descended, the two discrete buoyancy configurations may not be sufficient for safe deployment and recovery of the apparatus. For example, if the interior volume is completely flooded to deploy the apparatus, then it may descend too quickly and cause problems with the connecting line, mooring lines or the power umbilical; and if the device is completely filled with air for recovery it may ascend too quickly also causing problems.

The construction of a large vessel according to WO2010007418 by conventional means such as fabricated seam welded steel is an expensive process and likely to lead to a costly structure which will increase the cost of energy produced by the apparatus. Also manufacture of the apparatus as a sealed water/air tight shell structure would be difficult and expensive, requiring fabricated seam welded plate steel with specialist inspection to verify that the welds are watertight and/or airtight.

We have now devised improved reaction bodies relative to the arrangements disclosed in WO2010007418, which provide novel constructional features and means for providing additional buoyancy configurations during ascending and descending of the reaction body.

According to the invention, therefore, there is provided a reaction body for a wave energy apparatus having the features set out in claim 1. Preferred features of the invention are set out in the subsidiary claims. The present invention further comprises wave generating apparatus incorporating such a reaction body.

The reaction body is preferably used in apparatus which includes a submersible subsea reaction body; a buoyant body or float that can move in response to the waves; at least one energy converter and biasing means (such as an elastic return means or spring) generally mounted on the reaction body; and at least one connecting line to connect the buoyant body to the energy converter(s). The reaction body is preferably suspended from the float at a depth set by the length of the connecting line in the minimum buoyancy configuration and floating on the surface of the body of water in the maximum buoyancy configuration.

The submersible reaction body is generally of a hollow construction and can be selectively filled with air or water to adjust its buoyancy. The apparatus has a minimum buoyancy configuration (a submerged operating configuration in which the reaction body is generally full of water), and a maximum buoyancy or buoyant surface configuration in which the body is full of air, as well as (according to the invention) at least one intermediate buoyancy configuration between the minimum and maximum.

In a preferred embodiment of the invention, at least two such intermediate buoyancy configurations are provided, one being slightly of negative buoyancy and one being slightly of positive buoyancy.

In the submerged operating configuration, the submersible reaction body is generally suspended from the buoyant body at a depth sufficient to ensure that the reaction body is generally below the influence of waves on the sea surface. Therefore the movement of the buoyant body caused by the waves results in relative motion between the two bodies which can be exploited by the energy converter.

The submersible reaction body fulfils its function of providing a platform against which the float can react by being fillable with a large volume of sea water, giving it a corresponding large mass and therefore inertia.

In addition, the reaction body preferably has a large surface area perpendicular to the direction of the heave force, which thereby provides further resistance to movement by way of a large drag and added mass.

Furthermore, the reaction body generally has chambers which are not watertight when filled with water, but are airtight when filled with air—generally by provision of inflatable bladders each arranged to fill a respective one of the chambers.

In the buoyant surface configuration, the reaction body floats on the sea surface in the manner of a maritime vessel, with sufficient buoyancy for it to carry all other components of the apparatus, and it is in this configuration readily transportable across the sea surface. The apparatus including the reaction body can sit sufficiently high in the water that all connections to mooring lines and power lines can be clear of the water and be easily accessible. The apparatus can also create its own stable service platform with all serviceable components clear of the water to enable easy access for maintenance.

Air can be pumped into the submersible reaction body via a snorkel line attached to the surface float. Alternatively an air line can be deployed by a service vessel and connected to the reaction body as required. The snorkel line can either be separate from, or integral with, a connecting line. Air can be let out of the reaction body via a valve or valves that can be remotely operated from the surface if required.

In some embodiments of the invention, the subsurface reaction body includes bulkheads arranged to inhibit free flow of water internally of the subsurface reaction body.

The term "bulkhead" is used herein to mean an upright or downwardly extending partition dividing a maritime vessel into compartments and serving to limit the spread of water through the vessel. Each such bulkhead may further connect between two decks (in which case it may provide additional structural rigidity) or it may be at least in part vertically spaced from one or more decks. The bulkhead itself need not be vertical, provided it extends either upward or downward from a respective deck of the reaction body, either at right angles thereto or at another appropriate angle.

The bulkheads when used may be in an "array", which term is used herein to mean an orderly arrangement of the bulkheads, in which they are set out generally as rows and columns—which are typically orthogonal to one another.

The submersible reaction body can in some embodiments be divided into a series of chambers defined by bulkheads that are in a grid pattern in plan view. The chambers can be independently selectively filled with either air or water. These chambers can be isolated from one another so that flow of water from one to another is not permitted, or they can be open so as to permit such flow.

The division into a series of chambers has three main functions, as follows:

Firstly the chambers prevent sloshing of water within a single large chamber which could otherwise lead to stability problems during deployment and recovery;

secondly the chambers can be sized and configured in such a way that discrete buoyancy configurations are provided by the complete filling of combinations of chambers with either of water or air; and thirdly the chambers allow the water within the reactor body to be captured for the purposes of reaction without necessarily completely enclosing the chambers or the reaction body At least four buoyancy configurations have been identified, namely fully positively buoyant (surface configuration); fully negatively buoyant (operating configuration); slightly positively buoyant (ascending configuration for recovery); and slightly negatively buoyant (descending configuration for deployment). Other buoyancy configurations in addition to those identified are possible.

The chambers defined by the bulkheads do not have to be watertight and/or airtight sealed chambers—instead they can be partially closed chambers in which the filling of the chamber with air is achieved by inflating an air bladder within the chamber, and the filling of the chamber with water is achieved by deflating the air bladder and allowing the chamber to flood. All that is required of any bulkheads present is that they extend upwardly or downwardly from a deck, floor or hull of the reaction body to at least part of the height of the reaction body to form either internal barriers or bulkheads to the throughflow of water.

When the bulkheads extend only part of the height or spacing between respective decks of the reaction body, they form partially closed chambers. In this arrangement, the expense of fabricating sealed watertight and/or airtight chambers can be avoided and the structure of the reaction body can be manufactured at a significantly lower cost. Air bladders are a relatively low cost item compared to seam welded fabricated steel chambers, for example.

Variable buoyancy chambers can also be created by encaging bladders with a relatively open frame or basket structure and then filling the bladders with either of air or water, depending on the buoyancy configuration required. A cage around the bladder would allow the water or air contained within the bladder to be restrained, which would therefore transfer loads to the structure of the apparatus for the purpose of reaction.

Combinations of chambers and bladders that are partially closed or encaged to different degrees are envisaged within the same structure. Combinations of bladders that are filled with both water and air, and bladders that are filled with air only, are also possible within the same structure.

If the main structure of the reaction body does not have to be constructed as a watertight/airtight shell containing watertight and/or airtight chambers, then it lends itself to being manufactured from a frame based structure, which is a framework made from an assembly of interconnected struts or beams. The use of such a framework is likely to provide a superior structure when the apparatus is used for the purpose of transferring large loads.

Non-watertight chambers can easily be created within such a frame structure by attaching bulkheads to the frame members. Such bulkheads can be of a low cost material such as corrugated steel, fibreglass or high strength fabric. The bulkheads do not need to be close fitting either to the frame or to each other.

In order to provide sufficient submerged weight to the structure of the reaction body, additional ballast is likely to be required. Poured concrete is a good way to achieve a large amount of ballast at a low cost.

Poured concrete can also be utilised to form or partially form chambers within the reaction body according to the invention. In particular, concrete could be poured as a slab around a frame to form a base of the reaction body.

Preferred embodiments of the invention will now be described in more detail, with reference to the accompanying drawings, in which.

Like parts are denoted by like reference numerals throughout the drawings.

This following description of the invention should be read in conjunction with WO2010007418 because the invention can be considered an improvement of the 'reactor body' component of the apparatus described in WO2010007418. The apparatus according to the invention could however be used in conjunction with other types of wave energy converters and is not limited to use only with the wave energy converter apparatus described in WO2010007418.

Figure 1:
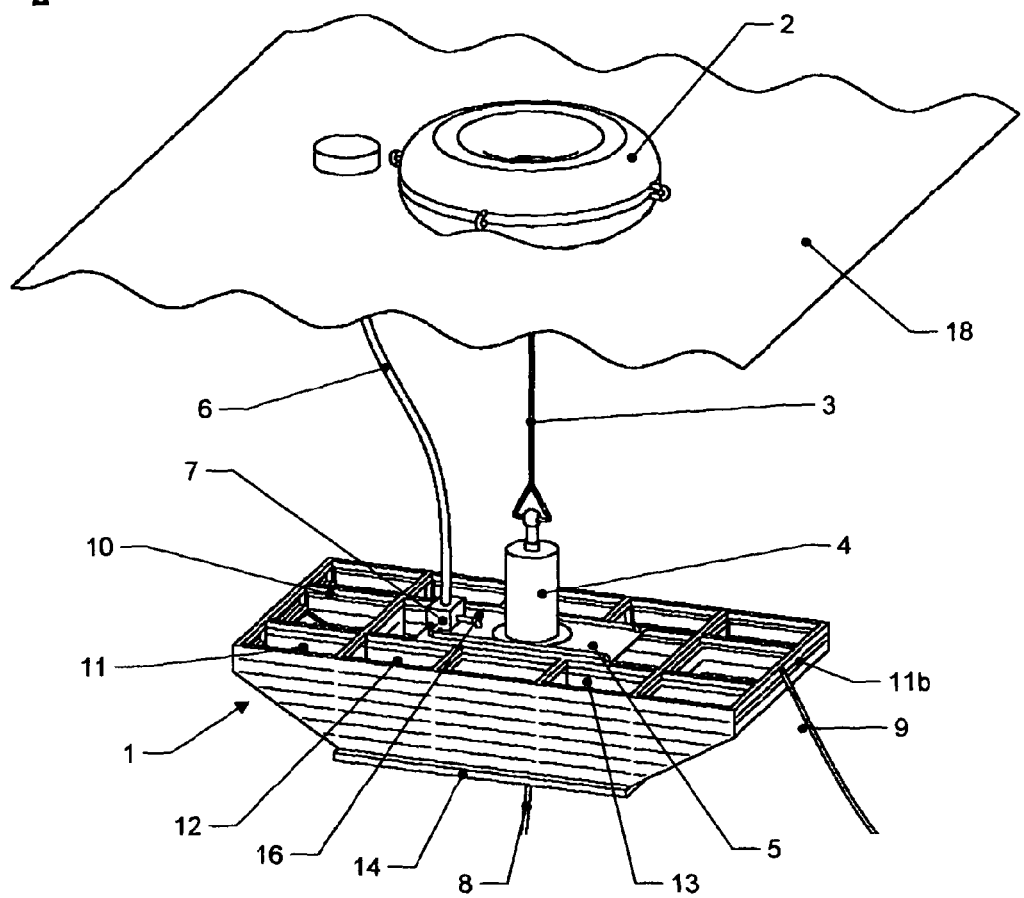
FIG. 1 is a perspective view of a first embodiment of the invention in a first configuration.

With reference to FIG. 1, the apparatus in the embodiment illustrated comprises the following components: a reaction body 1 that is to be positioned below the surface 18 of sea (away from the influence of surface waves); a float 2 that is moved by the waves; and a connecting line 3 that suspends the reaction body 1 from the float 2 at a depth set by the length of the connecting line 3.

Figure 2:
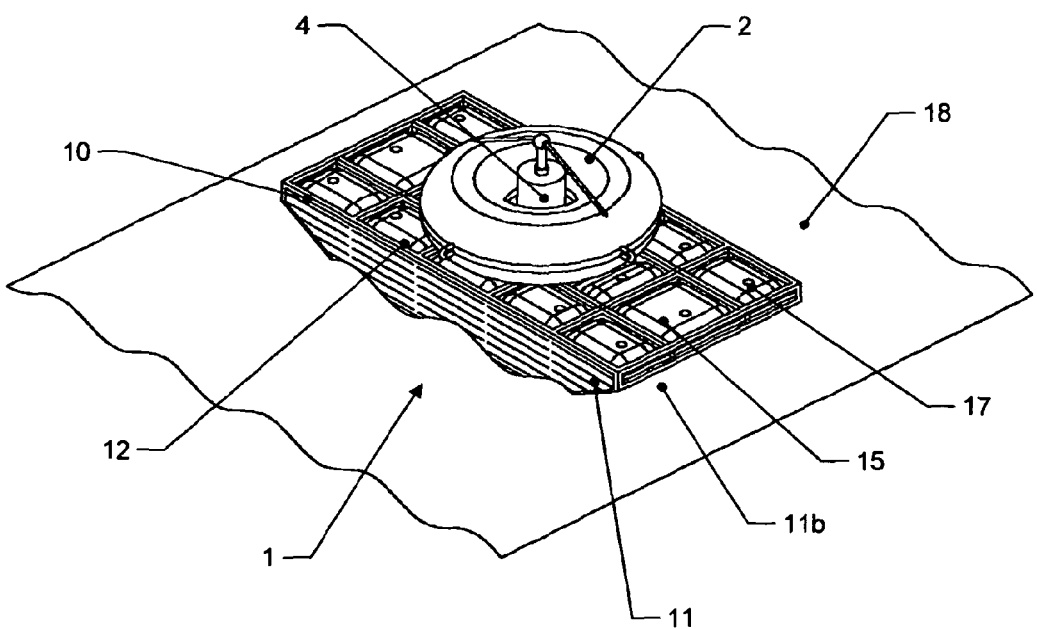
FIG. 2 is a perspective view of the apparatus of FIG. 1 in a second configuration.

In the arrangement shown in FIG. 2, the reaction body is in its maximum buoyancy configuration so that it floats on the surface 18, with the float conveniently stowed.

The apparatus illustrated further comprises a spring loaded energy converter 4 arranged to operate between the connecting line 3 and the reaction body 1. The energy converter 4 may be attached to, or mounted on, the reaction body 1. A machinery room 5 that may be watertight is provided in the illustrated embodiment to house additional components for the power take off and control systems.

Movement of the surface float 2 caused by waves results in relative motion between the surface float 2 and the reaction body 1. This movement is taken up by a working stroke of the spring loaded energy converter 4 and exploited to produce power, as described in more detail in the above-mentioned WO2010007418.

The reaction body 1 can be selectively filled with either water or air to enable the buoyancy of the reaction body 1 to be adjusted. Therefore the device has an operating configuration in which the reaction body 1 is full of water (FIG. 1), and a surface configuration in which the reaction body 1 is full of air (FIG. 2). A snorkel line 6 and valves 7 together allow air to be pumped into, or released from, the reaction body 1.

A power umbilical 8 is connected to the device to allow the useful power generated to be removed to a location where it can be used. For example, the umbilical 8 may be an electrical cable connected to an electricity grid, or a water pipe for delivering high pressure water to a desalination plant.

One or more mooring lines 9 (only one mooring line is shown) position the device relative to the sea bed (not shown) and are generally slack, allowing for larger ocean movements such as the tides, and also providing give in the case of extreme wave conditions. The depth of the reaction body 1 is set by the length of the connecting line 3 and not by the mooring lines 9.

In the following description of the drawings, a detailed reference to the exemplary reaction body 1 is given with an explanation as to how the reaction body 1 can be manufactured using low cost manufacturing techniques; how the reaction body 1 can achieve multiple buoyancy configurations; and how the water inside the reaction body 1 can be constrained in order to provide reaction mass and to prevent sloshing.

Figure 5:
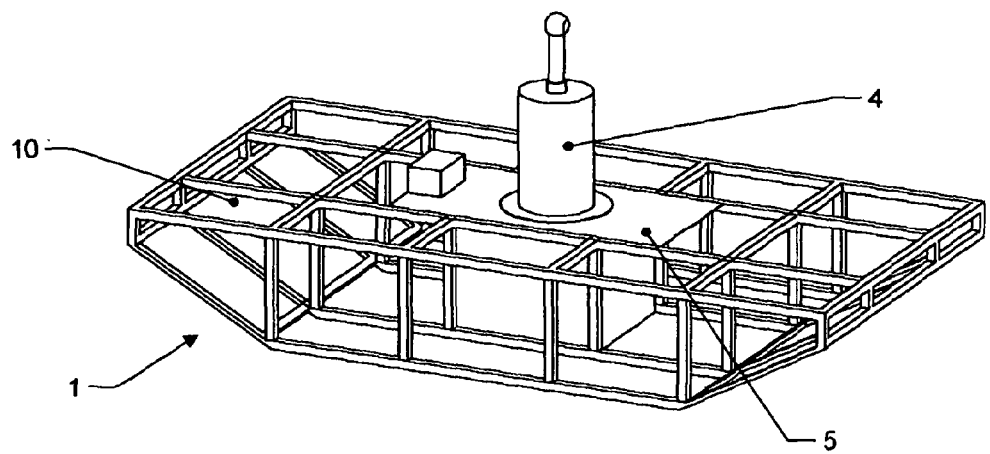
FIG. 5 is a perspective view of part of the apparatus of FIG. 1.
Figure 6:
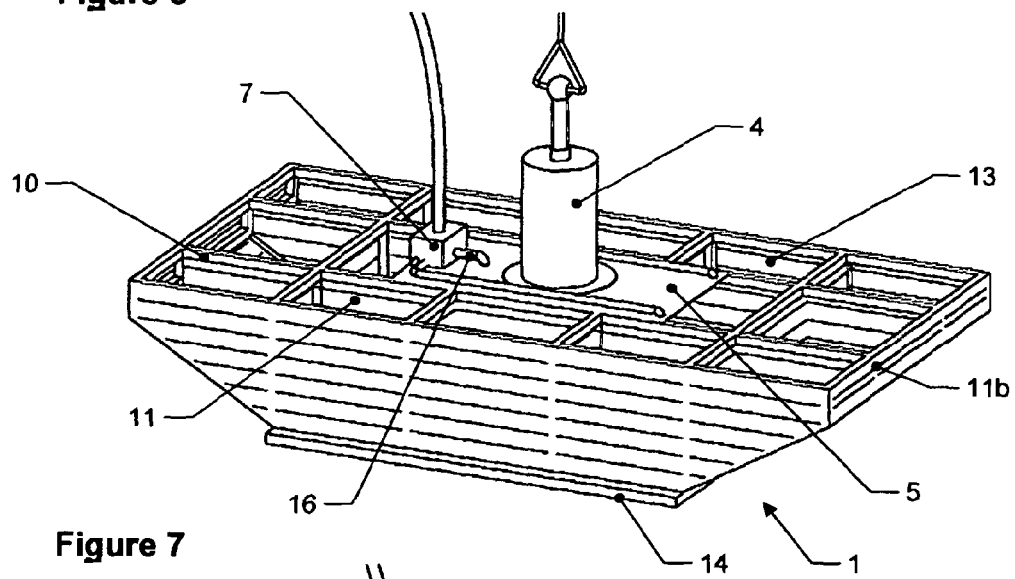
FIG. 6 is a further perspective view of part of the apparatus of FIG. 1.

The reaction body 1 as illustrated is constructed around a frame 10 consisting of a series of interconnected struts or beams. Internal bulkheads 11 may be attached to the frame in the arrangement of FIGS. 1 to 6 (as well as that of FIGS. 8 and 9), to create a grid arrangement of chambers 12 in the reaction body 1. The chambers 12 prevent or inhibit free flow of water through the frame 10, which thereby prevents or inhibits sloshing or uncontrolled inundation or flooding, and allows the water contained within the chambers 12 to add reaction mass to the reaction body 1. FIG. 5 shows the apparatus with the frame 10 only (with the bulkheads stripped away for illustrative purposes), whilst FIG. 6 shows the frame 10 with the bulkheads 11 in place, spanning between adjacent struts or beams.

Because (for the purposes of reaction) water only needs to be prevented from moving freely through the frame 10 (as opposed to being completely encapsulated by a sealed chamber), the bulkheads 11 do not need to be attached to the frame 10 in a watertight manner and the chambers 12 can accordingly be substantially open to the surrounding water. For the purposes of the present invention, a chamber 12, such as that shown in FIGS. 1 to 6, having an open top 13 is sufficient, although the chambers 12 can be further enclosed or completely sealed if desired.

In the first embodiment, bulkheads 11 may be made from corrugated steel, although other materials can be used, for example, high strength fabric, fibreglass or concrete.

Bulkheads 11b provided on the ends of the reactor body 1 can be angled or shaped so that they create a boat-like hull, such as that described in WO2010007418. If necessary, the end bulkheads 11b can be reinforced compared to the other (internal) bulkheads 11 in order to resist wave impacts.

Ballast 14 can be added to the bottom of the frame 10 to increase the submerged weight of the reaction body 1. The ballast 14 is beneficially positioned as low down as possible on the frame 10 to keep the centre of gravity of the reaction body 1 as low as possible in order to provide optimum benefits of stability.

In the first embodiment, concrete may be used as to make up the ballast 14. Concrete has the advantage of being low cost and very easy to manufacture—it can be simply poured around the base of the frame 10 as a slab using a very simple mould. It will flow between the frame 10 members and set around them providing a secure mechanical attachment, while at the same time forming bulkheads 11 in situ.

The chambers 12 do not need to be completely sealed for the purpose of containing water so as to add reaction mass to the reaction body 1, but they do need to be sealed when they are required to contain air for adjusting the buoyancy of the reactor body 1. Therefore bladders 15 may be fitted into the chambers 12, so that when it is desired to fill the chambers 12 with air, the bladders 15 will provide an airtight seal if non-sealed chambers 12 are employed in the apparatus. The use of bladders 15 is low cost compared to manufacturing airtight chambers due to the difficulties involved with manufacturing sealed airtight chambers 12.

Controlling the proportion of air and water in the reaction body will allow the deployment and recovery of the apparatus to be controlled as the buoyancy can be adjusted to allow slow ascending or descending. Therefore at least four buoyancy configurations have been identified: fully positively buoyant (surface configuration); fully negatively buoyant (operating configuration); slightly positively buoyant (ascending configuration for recovery); and slightly negatively buoyant (descending configuration for deployment).

However, controlling the proportion of air and water in a chamber that is subject to variable depths and therefore variable pressure is very difficult. It is better if chambers can be either completely full or completely empty of either of air or water to allow accurate buoyancy control.

Therefore the volume and position of the chambers 12 is such that the reaction body 1 is able to attain the required buoyancy configurations described above by combinations of chambers 12 that are either completely full of water or completely full of air. Therefore the need to control the ratio of water to air in any given chamber 12 is avoided, thereby simplifying the buoyancy control of the apparatus. Partial filling of the chambers 12 with either of air or water is still possible if desired.

Selective filling of the chambers 12 can be achieved by connecting each chamber 12 to a common air supply delivered to the reaction body 1 by the snorkel line 6. Individual air supply lines 16 can be connected to each chamber 12 and controlled by the valves 7. Dump valves 17 on or connected to each chamber 12 or bladder 15 allow air to be released from the chambers 12. The valves 7 and the dump valves 17 can be controlled remotely from a surface vessel or automatically.

Other methods of delivering air to the chambers 12 may be possible within the scope of the invention. For example a compressor or compressed air supplies may be incorporated into the reaction body 1.

With reference to FIG. 2, when the apparatus is in its surface configuration, all of the chambers 12 within the reaction body 1 are completely full of air, and the apparatus resides on the sea surface 18. The bladders 15 therefore are full of air.

The float 2 may be stowed on the top of the reaction body 1 when the apparatus is in its surface configuration.

With reference to FIG. 1, when the apparatus is in its operating (submerged) configuration (minimum buoyancy), all of the chambers 12 within the reaction body 1 are completely full of water and the reaction body 1 resides below the sea surface 18 suspended from the surface float 2 at a depth determined by the length of the connecting line 3. In this configuration all the bladders 15 are empty of air.

Figure 3:
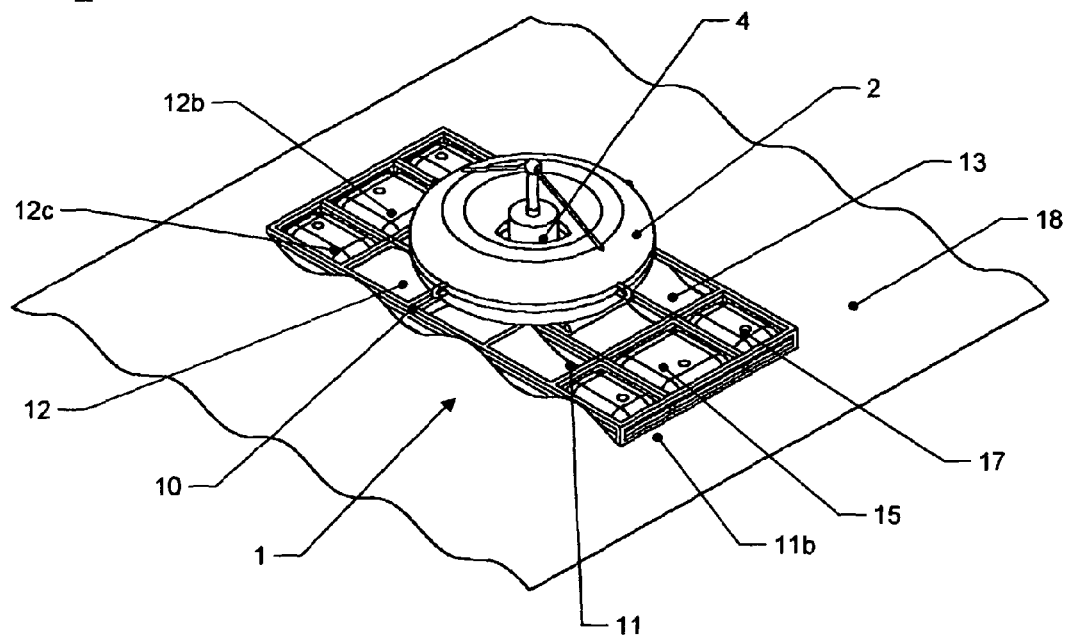
FIG. 3 is a perspective view of part of the apparatus of FIG. 1 in a third configuration.

With reference to FIG. 3, when the apparatus is in its ascending configuration (slightly positively buoyant), the middle end chambers 12b and the corner chambers 12c are full of air whilst the remaining chambers 12 are full of water. The total volume of air contained by the reaction body 1 is sufficient for the reaction body 1 to attain slight positive buoyancy.

Because the chambers 12 are above the ballast 14, the centre of buoyancy will be above the centre of gravity, which thereby ensures that the reaction body 1 will remain stable in the surrounding water with minimised tendency to flip over.

As a result of the slight positive buoyancy and the stability of the reaction body 1 in its ascending configuration shown in FIG. 3, when the reaction body 1 is being recovered it will tend to rise slowly and smoothly to the sea surface 18. When the reaction body 1 reaches the sea surface 18 it will just break the latter to an extent that the weight force and the buoyancy force are in equilibrium. Once in position just below the sea surface 18, it will be safe to fill all the remaining chambers 12 with air to bring the apparatus into its surface configuration.

Figure 4:
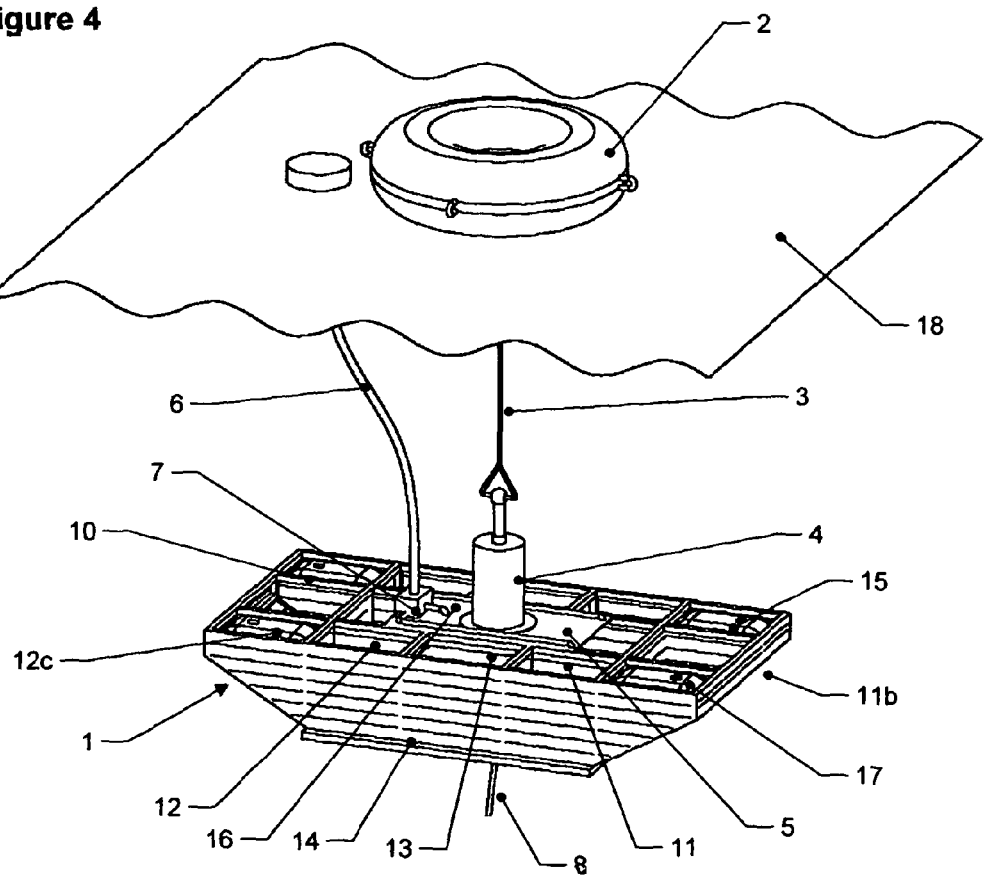
FIG. 4 is a perspective view of part of the apparatus of FIG. 1 in a fourth configuration.

With reference to FIG. 4, when the reactor body 1 is in its descending configuration (slightly negatively buoyant), only the corner chambers 12c are all full of air. The total volume of air contained within the reaction body 1 is sufficient for the apparatus to attain slight negative buoyancy. As in the ascending configuration, the chambers 12 that are filled with air are above the ballast 14, thereby ensuring that the reaction body 1 will remain stable in the surrounding water with minimised tendency to flip over during descent.

As a result of the slight negative buoyancy and the stability of the reaction body 1 in its descending configuration, when the apparatus is being deployed it will tend to sink slowly and smoothly from the sea surface 18 until it is suspended from the surface float 2 by the connecting line 3. Once the reaction body 1 is suspended from the surface float 2, it will be safe to fill all the chambers 12 with water to bring the apparatus into its operating configuration.

Figure 7:
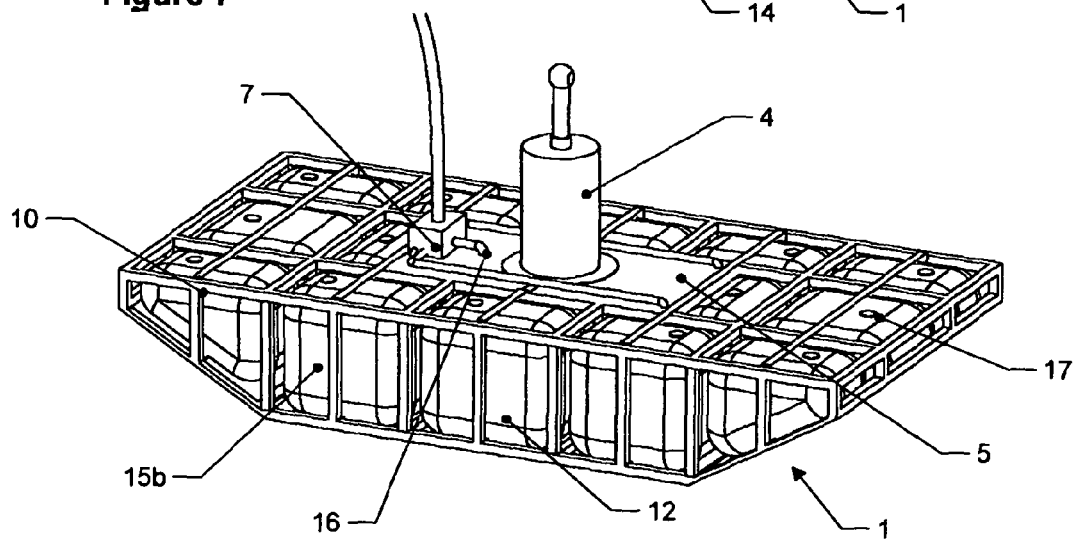
FIG. 7 is a perspective view of a second embodiment of the invention.

With reference to FIG. 7, a second embodiment of the invention is illustrated. The second embodiment is similar to the first embodiment but the reaction body 1, is only a frame 10 and has no pre-formed bulkheads 11 within it. Instead the bladders 15b can be filled with either of air or water (as opposed to only air in the first embodiment) and constrained by the frame 10. In this case each of the bladders 15b can be considered to correspond to a respective chamber 12. The bladders are of course airtight but the chambers formed by the frame 10 are not watertight.

Because a reaction body 1 comprising only a frame 10 would not prevent water passing freely through it, using the bladders 15b to hold water allows the mass of the water inside the frame 10 of reaction body 1 to be captured by the structure. This allows loads to be transferred to the frame 10 by the mass of water in the bladders 15*b* and therefore be effective for the purpose of reaction.

In the surface configuration, the bladders 15*b* are filled with air and expand to fill the space bounded by the frame 10. The behaviour of the apparatus on the surface would be similar to that of the previous embodiment.

Figure 8:
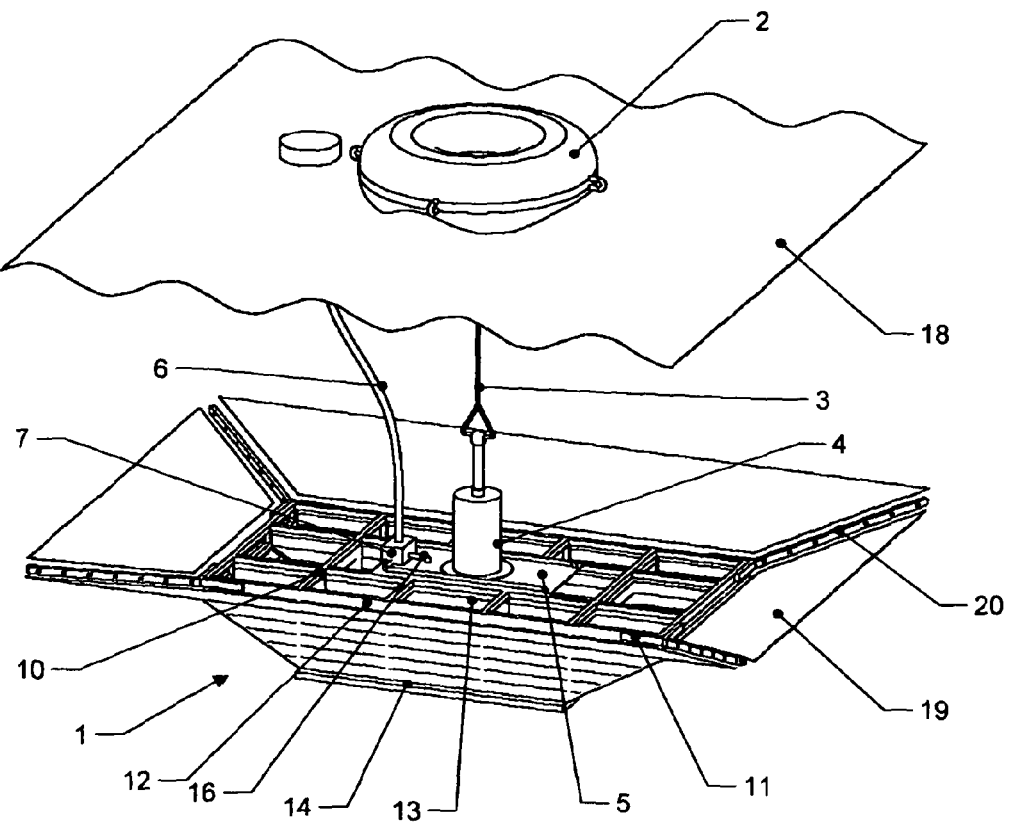
FIG. 8 is a perspective view of a third embodiment of the invention.
Figure 9:
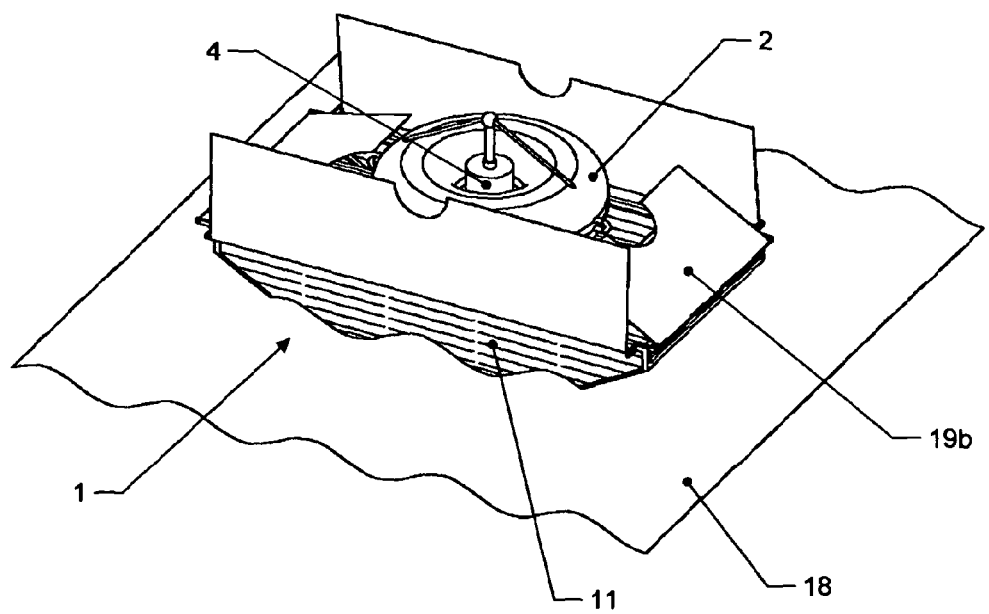
FIG. 9 is a perspective view of the embodiment of FIG. 8 in a second configuration.

With reference to FIGS. 8 and 9, a third embodiment of the invention that includes means for increasing the reactor effectiveness of the reaction body 1 is shown. Wings 18 protrude from the sides of the reaction body 1 that increase the added mass and drag when the reaction body is moved through the sea surface 18.

The wings 18 can be orientated according to the direction that resistance to movement through the water is required. For example, wings 18 with a horizontal span will resist vertical movement, whilst wings 18 with a vertical span will resist horizontal movement. Angled wings 18 will resist a combination of both horizontal and vertical movement.

In the illustrated embodiment of FIGS. 8 and 9, the wings 18 are positioned high on the sides of the reaction body 1 so that when the body is in its surface configuration the wings 18 are clear of the water and do not interfere with the transportation of the reaction body across the sea surface 18. Preferably the wings 18 are made from a lightweight material so they do not significantly alter the overall centre of gravity of the reaction body 1.

In the embodiment of FIGS. 8 and 9, the wings 18 may be made from sheets of high strength but lightweight material, such as woven polymer or fibreglass, supported and held in tension by spars 19 attached to the top corners of the frame 10 of the reaction body 1. Additional intermediate supporting spars may be added if required.

The wings 18 may be retractable, which may allow for easier deployment, recovery and surface transportation. With reference to FIG. 11, the wings 18*b* are shown in a retracted position achieved by folding the wings 18 toward the centre of the reactor body 1; however, any suitable retracting mechanism such as sliding, concertina folding or unfurling could be used.

The invention claimed is:

1. A subsurface reaction body arranged for use in apparatus for converting wave motion in a body of water to useful energy,
the subsurface reaction body having an array of chambers that (a) are sized and configured to inhibit free flow of water through the reaction body, (b) each have an enclosed interior space that can be independently selectively filled wholly with either air or water, and (c) are sized and configured to define a maximum buoyancy configuration of the reaction body which is positively buoyant when the chambers are filled wholly with air, a minimum buoyancy configuration of the reaction body which is negatively buoyant when the chambers are filled wholly with water, and a first intermediate buoyancy configuration of the reaction body which is negatively buoyant when a combination of one or more of the chambers are filled wholly with air and one or more of the chambers are filled wholly with water, wherein the subsurface reaction body is present in the first intermediate buoyancy configuration wherein a combination of one or more of the chambers are filled wholly with air and one or more of the chambers are filled wholly with water.

2. A reaction body according to claim 1, wherein the chambers are airtight when filled with air but not watertight when filled with water.

3. A reaction body according to claim 1, wherein the chambers are sized and configured to define a second intermediate buoyancy configuration of the reaction body which is positively buoyant when a combination of one or more of the chambers are filled wholly with air and one or more of the chambers are filled wholly with water.

4. A reaction body according to claim 1, in which the chambers are formed by an array of bulkheads.

5. A reaction body according to claim 1, which is provided with wings protruding from sides of the reaction body, said wings being arranged to increase the effective mass and drag when the reaction body is moved through the body of water.

6. A reaction body according to claim 4, in which the bulkheads are attached to a framework comprising interconnected beams.

7. A reaction body according to claim 4, in which respective bladders are provided to enable at least some of the chambers to be made watertight or airtight.

8. A reaction body according to claim 4, in which at least one of the bulkheads comprises ballast material.

9. A reaction body according to claim 5, wherein the wings are retractable.

10. An apparatus for converting wave motion in a body of water to useful energy, the apparatus comprising:
a buoyancy float which is movable in response to said wave motion;
a subsurface reaction body having inertia and drag to resist movement of said buoyancy float caused by said wave motion, said reaction body being suspended from said buoyancy float by a flexible connecting line which permits relative movement between said subsurface reaction body and said buoyancy float;
an energy converter for converting said relative movement to said useful energy; and
a spring for directionally biasing said subsurface reaction body relative to said buoyancy float;
the subsurface reaction body having an array of chambers that (a) are sized and configured to inhibit free flow of water through the reaction body, (b) each have an enclosed interior space that can be independently selectively filled wholly with either air or water, and (c) are sized and configured to define a maximum buoyancy configuration of the reaction body which is positively buoyant when the chambers are filled wholly with air, a minimum buoyancy configuration of the reaction body which is negatively buoyant when the chambers are filled wholly with water, and a first intermediate buoyancy configuration of the reaction body which is negatively buoyant when a combination of one or more of the chambers are filled wholly with air and one or more of the chambers are filled wholly with water, wherein the subsurface reaction body is present in the first intermediate buoyancy configuration wherein a combination of one or more of the chambers are filled wholly with air and one or more of the chambers are filled wholly with water.

11. An apparatus according to claim 10, wherein the chambers are airtight when filled with air but not watertight when filled with water.

12. An apparatus according to claim 10, wherein the chambers are sized and configured to define a second intermediate buoyancy configuration of the reaction body which is positively buoyant when a combination of one or more of the chambers are filled wholly with air and one or more of the chambers are filled wholly with water.

13. An apparatus according to claim 10, in which the chambers are formed by an array of bulkheads.

14. An apparatus according to claim 13, in which the bulkheads are attached to a framework comprising interconnected beams.

15. An apparatus according to claim 13, in which respective bladders are provided to enable at least some of the chambers to be made watertight or airtight.

16. An apparatus according to claim 13, in which at least one of the bulkheads comprises ballast material.

17. An apparatus according to claim 10, which is provided with wings protruding from sides of the reaction body, said wings being arranged to increase the effective mass and drag when the reaction body is moved through the body of water.

18. An apparatus according to claim 17, wherein the wings are retractable.

* * * * *